United States Patent [19]

Nakayama et al.

[11] Patent Number: 5,248,723
[45] Date of Patent: Sep. 28, 1993

[54] VINYL CHLORIDE POLYMER COMPOSITION

[75] Inventors: Yoji Nakayama; Yasuo Murase, both of Yokkaichi, Japan

[73] Assignee: Mitsubishi Kasei Vinyl Company, Tokyo, Japan

[21] Appl. No.: 849,831

[22] Filed: Mar. 12, 1992

Related U.S. Application Data

[63] Continuation of Ser. No. 493,774, Mar. 15, 1990, abandoned.

[30] Foreign Application Priority Data

Mar. 22, 1989 [JP] Japan .................... 1-67456

[51] Int. Cl.$^5$ .................... C08L 27/06; C08K 5/10
[52] U.S. Cl. .................... 524/527; 525/225; 524/523
[58] Field of Search .................... 525/239, 225; 524/527

[56] References Cited

U.S. PATENT DOCUMENTS

| | | |
|---|---|---|
| 2,898,244 | 8/1959 | Martin et al. |
| 3,555,122 | 1/1971 | Simmons .................... 260/899 |
| 3,660,320 | 5/1972 | Johnson et al. .................... 525/239 |
| 3,696,956 | 10/1972 | Merrill et al. .................... 215/40 |
| 3,711,576 | 1/1973 | Hawa .................... 525/239 |
| 3,723,576 | 3/1973 | McClaine et al. .................... 525/239 |
| 3,766,106 | 10/1973 | Yarimoto et al. .................... 525/239 |
| 3,796,776 | 3/1974 | Ide et al. .................... 525/239 |
| 4,267,084 | 5/1981 | Mirutani et al. .................... 525/239 |
| 4,668,740 | 5/1987 | Okano .................... 525/239 |
| 4,978,718 | 12/1990 | Haller et al. .................... 525/239 |

FOREIGN PATENT DOCUMENTS

| | | |
|---|---|---|
| 650651 | 10/1962 | Canada .................... 525/239 |
| 55-078045 | 6/1980 | Japan .................... 525/239 |
| 58-201833 | 11/1983 | Japan .................... 525/239 |
| 59-27774 | 7/1984 | Japan . |
| 62-34786 | 7/1987 | Japan . |

OTHER PUBLICATIONS

*Japanese Industrial Standard K 6721*, "Testing Method for Polyvinyl Chloride," UDC 678.743.22:678.01 (1977).

Primary Examiner—Carman J. Seccuro, Jr.
Attorney, Agent, or Firm—Oblon, Spivak, McClelland, Maier & Neustadt

[57] ABSTRACT

A vinyl chloride polymer composition comprising from 50 to 90 parts by weight of a vinyl chloride polymer having an average particle size of from 5 to 80 μm and an average degree of polymerization of at least 2500 and from 50 to 10 parts by weight of a vinyl chloride polymer capable of forming a plastisol.

12 Claims, No Drawings

VINYL CHLORIDE POLYMER COMPOSITION

This application is a continuation of application Ser. No. 07/493,774, filed on Mar. 15, 1990, now abandoned.

The present invention relates to a vinyl chloride polymer composition. More particularly, it relates to a vinyl chloride polymer composition which, when formed into molded products by a processing technique such as casting, dip molding, slush molding, rotational molding or coating method, presents little adhesion of the molded products from one another.

A vinyl chloride polymer for pastes (i.e. a paste resin) is widely used for molded products such as globes, artificial leathers, floor materials so-called cushion floors. While these molded products are excellent in the surface smoothness, they usually have drawbacks such that depending upon the processing conditions, the adhesive properties of the molded products to one another are substantial, whereby the operation efficiency during the processing tends to be poor, and the handling of the products is likely to create a problem and it is likely to impair the commercial value of the products.

Heretofore, to prevent the adhesion, it has been attempted to apply a fine powder such as talc on the surface of the molded products. However, such a method is costly and has a problem that it is likely to lead to a deterioration of the working environment due to the scattering of the fine powder. Further, there is a method in which a roughened pattern is formed on the surface of the molded products by mechanically embossing during the processing. However, such a method requires an installation for the processing and thus is economically disadvantageous. Further, with a view to imparting a fine roughened pattern on the surface, it has been attempted to incorporate a polymer having a relatively large particle size called a blending resin. However, no adequate effects have been obtained by this method. Various compositions for non-adhesive or delustered molded products, using common vinyl chloride polymers produced by usual suspension polymerization have been proposed. However, with these compositions, it is impossible to obtain plastisols, and they are not useful for casting, dip molding, slush molding, rotational molding or coating method.

It is an object of the present invention to obtain a vinyl chloride polymer composition which, when formed into molded products by a processing technique such as casting, dip molding, slush molding, rotational molding or coating method, is excellent in the surface smoothness and presents little adhesion of the molded products to one another, whereby the operation efficiency is excellent and the handling of the products is easy.

The present inventors have conducted extensive studies to solve the above problems of the conventional techniques and to provide a vinyl chloride polymer composition which, when formed into molded products, presents little adhesion of the molded products to one another. As a result, it has been found that the above object can be attained by a composition obtained by blending a vinyl chloride polymer having a certain specific average particle size and a specific average degree of polymerization and a vinyl chloride polymer capable of forming a plastisol, in a certain specific ratio. The present invention has been accomplished on the basis of this discovery.

Thus, the present invention provides a vinyl chloride polymer composition comprising from 50 to 90 parts by weight of a vinyl chloride polymer having an average particle size of from 5 to 80 $\mu$m and an average degree of polymerization of at least 2500 and from 50 to 10 parts by weight of a vinyl chloride polymer capable of forming a plastisol.

Now, the present invention will be described in detail with reference to the preferred embodiments.

The vinyl chloride polymer having an average particle size of from 5 to 80 $\mu$m and an average degree of polymerization of at least 2500 used in the present invention, belongs to the category of a resin so-called a blending resin. It can be produced by adjusting the degree of polymerization, for example, by controlling the polymerization temperature during suspension polymerization in water containing a protective colloid agent such as a water-soluble protein by using a oil soluble polymerization initiator, or by adding a bifunctional or higher functional so-called cross linkable co-monomer.

Such a vinyl chloride polymer (hereinafter referred to as a blending resin) to be used in the present invention, is required to have an average particle size of from 5 to 80 $\mu$m, preferably from 10 to 50 $\mu$m. If the average particle size exceeds 80 $\mu$m, the physical properties and the surface smoothness of the molded products thereby obtained, tend to be inferior. On the other hand, if it less than 5 $\mu$m, the desired non-adhesive effect of the molded products can not adequately be obtained. Further, the blending resin is required to have an average degree of polymerization of at least 2500. If the average degree of polymerization is less than 2500, the physical properties and the non-adhesive effect of the molded products tend to be inadequate. On the other hand, the vinyl chloride polymer capable of forming a plastisol, to be used in the present invention, is usually called a paste resin. It may be any vinyl chloride polymer so long as it is capable of forming a plastisol when combined with the above-mentioned blending resin. Such a vinyl chloride polymer (hereinafter referred to as a paste resin) can be produced usually by an emulsion polymerization method employing a water-soluble polymerization initiator, or by a micro suspension polymerization method employing an oil-soluble polymerization initiator wherein polymerization is conducted under such a state that the monomer is mechanically uniformly and finely dispersed in water by means of a homogenizer.

The proportions of the blending resin and the paste resin in the vinyl chloride polymer composition of the present invention are required to be such that the blending resin is from 50 to 90 parts by weight and the paste resin is from 50 to 10 parts by weight, when the total amount of both resins is 100 parts by weight. Particularly preferred are the proportions such that the blending resin is from 60 to 85 parts by weight, and the paste resin is from 40 to 15 parts by weight. If the proportion of the paste resin exceeds 50 parts by weight, the non-adhesive effect of the resulting molded products will be inadequate. On the other hand, if the proportion of the paste resin is less than 10 parts by weight, the deterioration of the physical properties of the molded product will be substantial, and such is not practically feasible. As the above-mentioned two types of vinyl chloride polymers, not only the vinyl chloride homopolymer, but also a copolymer of vinyl chloride with at most 20% by weight, preferably at most 10% by weight, of co-monomers, may be employed.

To use the vinyl chloride polymer composition of the present invention, the above-mentioned two types of vinyl chloride polymers are mixed with a plasticizer and a stabilizer, and if necessary, well known additives such as an antioxidant, a ultraviolet absorber, a filler, an antistatic agent, a coloring agent and a releasing agent, are mixed, to obtain a plastisol, or an organosol with a further addition of a diluent. Such a plastisol or organosol is then processed to a molded product by casting, dip molding, slush molding, rotational molding, coating method or the like.

The plasticizer includes, for example, well known phthalic acid plasticizers such as di-n-butyl phthalate, di-n-octyl phthalate, di-2-ethylhexyl phthalate, diisooctyl phthalate, diisononyl phthalate, diisodecyl phthalate, octyldecyl phthalate, butylbenzyl phthalate, di-2-ethylhexyl isophthalate and phthalic acid ester of higher alcohols having from 11 to 13 carbon atoms; trimellitic acid plasticizers such as di-n-octyl-n-decyl trimellitate, tri-2-ethylhexyl trimellitate, triisodecyl trimellitate and tri-n-octyl trimellitate; fatty acid ester plasticizers such as di-2-ethylhexyl adipate, di-n-decyl adipate, diisodecyl adipate, di-2-ethylhexyl azelate, dibutyl sebacate and di-2-ethylhexyl sebacate; phosphoric acid ester plasticizers such as tirbutyl phosphate, tri-2-ethylhexyl phosphate, 2-ethylhexyldiphenyl phosphate and tricresyl phosphate; epoxy plasticizers such as epoxidized soybean oil, epoxidized linseed oil and epoxidized tall oil 2-ethylhexyl fatty acid, and liquid epoxy resins. These plasticizers may be used alone or in combination as a mixture of two or more. The plasticizer is used in an amount of from 60 to 150 parts by weight, preferably from 75 to 120 parts by weight, relative to 100 parts by weight of the total amount of the above-mentioned two types of vinyl chloride polymers. If the amount of the plasticizer is too small, the viscosity increases substantially and in some cases, it becomes difficult to obtain a plastisol. On the other hand, if the amount of the plasticizer is excessive, the blending resin precipitates, whereby it becomes difficult to maintain the uniformity of the system, and bleeding of the plasticizer is likely to result. The stabilizer includes lead type, barium-zinc type, calcium-zinc type, magnesium-zinc type, calcium-barium type, cadmium-barium type, barium-zinc-tin type, cadmium-barium-zinc type and organic tin type stabilizers well known as stabilizers for vinyl chloride polymers. The stabilizer is used in an amount of from 0.1 to 5 parts by weight, preferably from 0.15 to 3 parts by weight, relative to 100 parts by weight of the total amount of the above-mentioned two types of vinyl chloride polymers.

As described in detail in the foregoing, the vinyl chloride polymer composition of the present invention is a composition comprising a blending resin and a paste resin, which contains a blending resin having a large particle size as compared with a paste resin i.e. as large as an average particle size of from 5 to 80 $\mu$m and having a high degree of polymerization i.e. an average degree of polymerization of at least 2500, in a large amount i.e. from 50 to 90% by weight of the total amount of the polymers.

The composition of the present invention with such a composition is mixed with a plasticizer to obtain a plastisol, which is then molded by a paste technique such as casting, dip molding, slush molding, rotational molding or coating method, whereby the melting of the blending resin during the processing is suppressed so that constant mold processing can be conducted, and at the same time fine roughness is imparted to the surface of the molded product, so that excellent non-adhesiveness will be attained and a delustering effect will simultaneously be obtained.

As its name tells, the blending resin is usually used in admixture with a paste resin to prepare a plastisol or an organosol, whereby non-adhesive properties will be imparted to the molded products to some extent. However, if it is incorporated in a large amount, the physical properties such as the tensile strength and elongation of the molded products tend to substantially deteriorate. Therefore, its proportion has been limited to a level of not more than 40% by weight of the total amount of the resins, and the proportion has never exceeded 50% by weight. Whereas, in the composition of the present invention, among usual blending resins, the one having a relatively fine particle size and having a high degree of polymerization is used in a large amount, whereby surprisingly, the deterioration of the physical properties of the molded products is not remarkable, and practically there is no problem, and whereby excellent non-adhesiveness and delustering effects can be imparted as mentioned above.

Now, the present invention will be described in further detail with reference to Examples and Comparative Examples. However, it should be understood that the present invention is by no means restricted to such specific Examples.

In the following Examples and Comparative Examples, the amounts of the plasticizer and other additives are represented by parts by weight relative to 100 parts by weight of the total amount of the vinyl chloride polymers.

Further, the average polymerization degree and the average particle size of the blending resin and the non-adhesive properties and the delustering effects of the molded products were evaluated in accordance with the following methods, respectively.

Average polymerization degree: The average polymerization degree was measured by a viscosity method in accordance with JIS K6721.

Average particle size: The average particle size was determined by a particle size distribution measuring apparatus of a centrifugal precipitation type (SA-CP3, manufactured by Shimadzu Corporation)

Evaluation of non-adhesive properties

A plastisol was coated on a releasing paper in a thickness of 0.1 mm and heated for 3 minutes in an oven of 190° C. for gelation and melting. A pair of sheets obtained in this manner were put together with their surfaces in contact each other and sandwiched between glass plates. Then, they were left to stand under a load of 2 kg in a constant temperature room at 23° C. for 24 hours. Then, they were withdrawn and the state of mutual adhesion was evaluated visually and by peeling.

Non-adhesive properties

⊙: Excellent
○: Good
△: Slightly inferior
X: Inferior

Evaluation of delustering effects

With respect to the sheets used for the evaluation of the non-adhesive properties, the surface reflectance (%) was measured at an incident light angle of 60° and at a reflected light measuring angle of 120°.

EXAMPLES 1 to 5 and COMPARATIVE EXAMPLES 1 to 5

Preparation of a blending resin

In a polymerization reactor with glass lining having an internal capacity of 15 m³, 8000 kg of pure water, an aqueous solution obtained by dissolving 10 kg of an acid-treated gelatin having a jelly strength of 100 bloom and an isoelectric point of 8.3 and 15 kg of a polyvinyl pyrrolidone having a K-value of 90 in 300 kg of pure water, 7.5 kg of diallyl phthalate, 0.3 kg of sodium dodecylbenzene sulfonate and 3.2 kg of disodium hydrogen phosphate, were charged. After raising the internal temperature to 55° C., the internal pressure of the polymerization reactor was reduced to −640 mmHg. While maintaining this state for 10 minutes, the air in the polymerization system was removed. Then, 5000 kg of a vinyl chloride monomer and 1.5 kg of tert-butyl pivalate were injected under stirring, and the polymerization reaction was conducted at 50° C. After completion of the reaction, the temperature in the reactor was raised to 70° C, and an unreacted vinyl chloride monomer was removed under reduced pressure. To the polymer solution, 500 g of sodium carbonate and 500 g of calcium acetate were added to bring the pH to 7.

To this solution, neutral (slightly alkaline) protease obtained from *Bacillus thermoproteolyticus Rokko* one of high temperature bacteria, was added in an amount corresponding to a strength of 50,000,000 protease units, and the mixture was stirred for 30 minutes, followed by removal of water and drying to obtain a vinyl chloride blending resin having an average degree of polymerization of 3000.

A vinyl chloride blending resin having an average degree of polymerization of 2800 was prepared by the same treatment as above except that the amount of diallyl phthalate used in the production of the above blending resin, was changed to 6 kg.

Further, a vinyl chloride blending resin having an average degree of polymerization of 950 was prepared by the same treatment as above except that no diallyl phthalate was used and the polymerization temperature was changed to 58° C.

Preparation of a plastisol

A blending resin obtained in the above Preparation Example and identified in Table 1 and a paste resin (Vinika® P450, manufactured by Mitsubishi Kasei Vinyl Company, average degree of polymerization: 1000) were mixed in the proportions as identified in Table 1 to obtain a composition. To this composition, di-n-octyl phthalate (plasticizer) in an amount as identified in Table 1, 3 parts by weight of a liquid tin-type stabilizer (T-17MJ, manufactured by Katsutu Kako Co., Ltd.) and 1 part by weight of a pigment (VT6740, manufactured by Dainichiseika Color & Chemicals Mfg. Co., Ltd.) were added to obtain plastisol. The non-adhesive properties and the surface reflectance of the plastisol thus obtained are shown in Table 1.

TABLE 1

| | Blending resin | | | Paste resin amount (parts by weight) |
|---|---|---|---|---|
| | Average polymerization degree | Average particle size (μm) | Amount (parts by weight) | |
| Example 1 | 3000 | 45 | 80 | 20 |
| Example 2 | 3000 | 45 | 50 | 50 |
| Example 3 | 2800 | 41 | 50 | 50 |
| Example 4 | 3000 | 45 | 90 | 10 |
| Example 5 | 3000 | 45 | 80 | 20 |
| Comparative Example 1 | 3000 | 45 | 30 | 70 |
| Comparative Example 2 | 950 | 43 | 80 | 20 |
| Comparative Example 3 | — | — | — | 100 |

| | Plasticizer amount (parts by weight) | Non-adhesive properties | Surface reflectance (%) |
|---|---|---|---|
| Example 1 | 80 | ⊙ | 3.1 |
| Example 2 | 80 | ○-⊙ | 7.6 |
| Example 3 | 60 | ⊙ | 5.1 |
| Example 4 | 150 | ○ | 9.8 |
| Example 5 | 90 | ○-⊙ | 8.9 |
| Comparative Example 1 | 80 | ○-△ | 15.4 |
| Comparative Example 2 | 80 | △ | 35.3 |
| Comparative Example 3 | 80 | X | 81.6 |

From the results in Table 1, it is apparent that the vinyl chloride polymer composition of the present invention presents little adhesive properties to molded products when its plastisol or organosol is formed into such products as sheets, gloves, artificial leathers, cushion floors, etc. by casting, dip molding, slush molding, rotational molding or coating method, and thus is capable of providing good operational efficiency, and yet it is capable of presenting molded products having excellent delustering effects.

We claim:

1. A plastisol comprising:
   (A) 100 parts by weight of a vinyl chloride polymer composition comprising
   (i) from 60 to 90 parts by weight of a vinyl chloride blending resin having an average particle size of from 5 to 80 μm and an average degree of polymerization of at least ob 2500, measured by a viscosity method in accordance with JIS K6721, and
   (ii) from 40 to 10 parts by weight of a vinyl chloride paste resin which forms a plastisol when combined with said vinyl chloride blending resin, said vinyl chloride blending resin having a higher average degree of polymerization and a larger particle size than said vinyl chloride paste resin; and
   (B) from 60 to 150 parts by weight of a plasticizer.

2. The composition according to claim 1, wherein the vinyl chloride polymer having an average degree of polymerization of at least 2500, has an average particle size within an range of from 10 to 50 μm.

3. The composition according to claim 1, wherein the vinyl chloride polymer having an average particle size of from 5 to 80 μm and an average degree of polymerization of at least 2500, is treated with a protease.

4. The composition according to claim 1, wherein the vinyl chloride polymer having an average particle size of from 5 to 80 μm and an average degree of polymerization of at least 2500, is from 60 to 85 parts by weight, and the vinyl chloride polymer capable of forming a plastisol, is from 40 to 15 parts by weight.

5. The plastisol of claim 1, wherein said plasticizer is present in an amount of from of 75 to 120 parts by weight.

6. The plastisol of claim 1, wherein said first vinyl chloride polymer further comprises diallyl phthalate in an amount of about 0.15wt. % with respect to vinyl chloride.

7. The plastisol of claim 1, wherein said vinyl chloride blending resin consists essentially of vinyl chloride and from about 0.12 to about 0.15 wt. % of diallyl phthalate, based on the weight of vinyl chloride.

8. The plastisol of claim 1, wherein said vinyl chloride paste resin is prepared by emulsion polymerization, using a homogenizer.

9. The plastisol of claim 3, wherein said protease is obtained from a high temperature bacterium.

10. The plastisol of claim 9, wherein said treatment comprises contacting a solution of said blending resin with said protease for 30 minutes at a temperature of from about 55° C. to about 58° C.

11. The plastisol of claim 10, wherein said protease is added in a concentration of about 6,000 units/L.

12. The plastisol of claim 9, wherein said high temperature bacterium is *Bacillus thermoproteolyticus Rokko*.

* * * * *